United States Patent [19]

Hall

[11] Patent Number: 4,489,469
[45] Date of Patent: Dec. 25, 1984

[54] PROCESS FOR THE PRODUCTION OF GAS TURBINE ENGINE ROTORS AND STATORS

[75] Inventor: Robert T. Hall, Milford, Mich.

[73] Assignee: Williams International Corporation, Walled Lake, Mich.

[21] Appl. No.: 485,881

[22] Filed: Apr. 18, 1983

[51] Int. Cl.³ .................... B21K 3/04; B23P 15/02; B23P 15/04
[52] U.S. Cl. .................. 29/156.8 R; 29/418; 29/423; 29/DIG. 5; 29/DIG. 29; 164/11; 164/45; 164/112; 249/142; 264/219; 264/220; 264/250; 264/255; 264/277; 264/334
[58] Field of Search ............... 29/156.8 R, 156.8 CF, 29/418, 423, DIG. 5, DIG. 29; 164/9, 10, 11, 45, 112; 249/83, 84, 85, 95, 96, 97, 127, 142; 264/219, 220, 225, 227, 250, 255, 258, 277, 334

[56] References Cited

U.S. PATENT DOCUMENTS

| | | | |
|---|---|---|---|
| 839,242 | 12/1906 | Wilkinson | 29/156.8 R |
| 876,123 | 1/1908 | Wilkinson | 29/156.8 R |
| 1,005,736 | 10/1911 | Wilkinson | 164/11 |
| 1,620,974 | 3/1927 | Klenk | 29/156.8 R |
| 1,621,002 | 3/1927 | Dimberg | 29/156.8 R |
| 2,097,314 | 10/1937 | Wales | 164/11 |
| 3,136,831 | 6/1964 | Zinn | 264/225 |
| 3,982,934 | 9/1976 | Wentzell | 164/45 X |
| 4,037,816 | 7/1977 | Scott | 249/83 |
| 4,048,270 | 9/1977 | Stegmeir | 264/219 X |

Primary Examiner—Charlie T. Moon
Assistant Examiner—Ronald S. Wallace
Attorney, Agent, or Firm—Lyman R. Lyon

[57] ABSTRACT

The disclosure relates to a method of manufacturing a gas turbine rotor or stator using elastomeric rings for the retention of the rotor or stator blades in a core mold. The elastomeric rings are split to facilitate disassembly thereof from the blade core which is thereafter utilized in a cope and drag casting system.

2 Claims, 4 Drawing Figures

PROCESS FOR THE PRODUCTION OF GAS TURBINE ENGINE ROTORS AND STATORS

BACKGROUND OF THE INVENTION

The production of bladed rotors and stators is a critical element in the production of gas turbines. Means of producing bladed elements of the required accuracy without incurring excessive costs are always being sought. The present invention describes a method wherein accurately formed blades, manufactured by such methods as rolling, extruding, coining, etc., are accurately positioned and retained by casting continuous rings around their ends.

The method described has the further advantage that materials can be selected to separately optimize the properties of the blade and the rings. For example, steel blades having good abrasion and fatigue resistance can be cast into light weight aluminum rings.

SUMMARY OF THE INVENTION

The fabrication process of the instant invention makes it possible to produce relatively simple, low cost dual-property, permanently assembled compressor stators for use in small gas turbine engines. The stators have discrete, high strength formed blades mechanically locked into cast inner and/or outer structural rings. The process may also be applied to compressor or turbine rotors in those cases where centrifugal forces can be accommodated by the mechanical interlock.

The process includes, as a first step, the manufacture by casting technology of a pair of elastomeric rings. This is done by constructing aluminum molds containing concentric rings with electrical discharge machined slots. Thereafter, the slots are loaded with dummy airfoils and the elastomer is cast. After "set" of the elastomer, the dummy airfoils are pulled out and the rings removed from the cast. Both cylindrical elastomer rings are then split so that they may be hooped or unwrapped at a later stage in the process.

The elastomeric rings are then placed in a vane core mold box in conjunction with metal backup rings that support the flexible material in the hooped position and control the position and concentricity relationships between the hoops.

The vane core mold box is assembled except for the outer backup ring, whereupon vanes are pushed through the slots in the outer elastomeric ring until they engage the slots in the inner ring. The outer backup ring is then placed in position and the vane core mold box is ready to accept any suitable foundry molding material such as plaster or sand and binder.

After "set" of the core the metal backup rings are removed and the core and both elastomeric rings are removed from the box. The flexible rings are then unwrapped and removed from the core leaving the vanes in their casting position and ready for assembly into a cope and drag mold for casting of a hub or shroud thereabout.

Parts produced by the subject process may incorporate, for example, stainless steel vanes and cast aluminum hubs and shrouds. The vanes are captured by casting on of the aluminum hub or shrouds, the roots thereof being notched and/or pierced to form a pin lock which mechanically augments the joint created by the solidification of the aluminum around the vane root.

The advantages of the elastomeric ring process of the instant invention over the fixed steel ring process of the prior art are that vanes of sophisticated geometry, i.e., variable twist, camber and section, can be used, labor is reduced by elimination of the heretofore required step of vane shifting, and sand chipping and core repair are minimized. Moreover, vanes with burrs can be used totally eliminating the heretofore required step of blade finishing.

This invention results in the economical manufacture of gas turbine engine rotors and stators which exhibit lightweight, high strength and high aerodynamic efficiency characteristics. The process accommodates all types of vane design and geometry. With regard to vane section, camber, and twist, the process can accept these characteristics whether they be constant or variable.

DETAILED DESCRIPTION OF THE PREFERRED EMBODIMENT OF THE INVENTION

Figure 1:
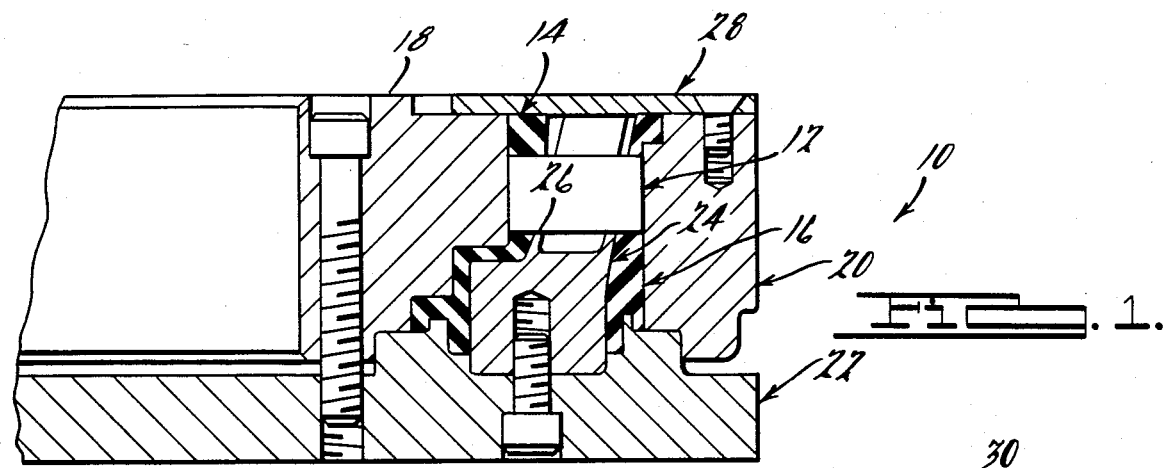
FIG. 1 is a sectional elevation of the blade location tooling used to form a pair of elastomeric support rings for the blades of a gas turbine engine stator.

Referring to FIG. 1 of the drawing, an elastomeric ring mold 10 is utilized to position a plurality of dummy blades 12 of any desired cross section for casting of a pair of elastomeric rings 14 and 16. The mold 10 comprises precision inner and outer rings 18 and 20 of, for example, aluminum, that are mounted on a complementary annular base plate 22. A dummy blade ring 24 supports the dummy blades 12, the blades 12 being inserted through complementary slots 26 therein. A cover plate 28 closes the cavity defined by the aforementioned mold elements.

Liquid rubber or an elastomeric compound is poured over the blades 12 and allowed to cure to form the elastomeric rings 14 and 16. Thereafter the mold 10 is disassembled, the elastomeric rings 14 and 16 are slit longitudinally and stripped from the dummy blade ring 24 and blades 12. The elastomeric rings 14 and 16 are then ready for assembly into a vane core mold box 30.

Figure 2:
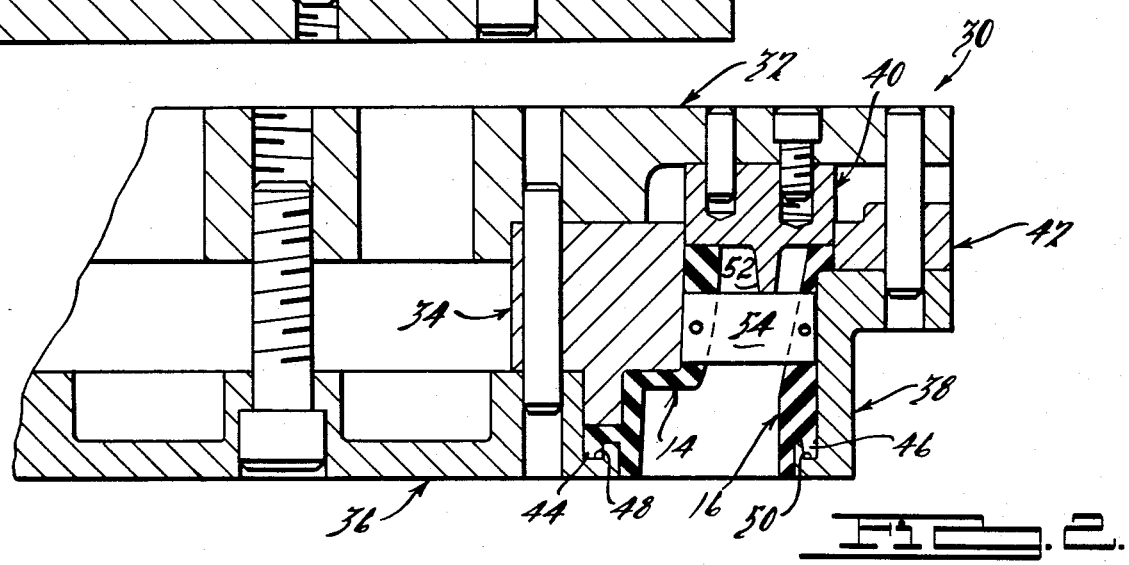
FIG. 2 is a sectional view of a vane core mold box, inverted for purposes of illustration, with the blades and the elastomeric rings in position.

As seen in FIG. 2, the vane core mold box 30 comprises an alignment plate 32, an inner vane setter 34, an inner ring retainer 36, an outer ring retainer 38, a key ring 40, and a close-out ring 42.

In accordance with one feature of the instant invention, the elastomeric rings 14 and 16 are provided with annular locking flanges 44 and 46, respectively, that nest in complementary grooves 48 and 50 in the inner ring retainer 36 and outer ring retainer 38. The key ring 40 is provided with an annular flange 52 that engages and positively positions, along with the inner and outer retainer rings 36 and 38, respectively, a plurality of blades 54. The ends of the blades 54 are accommodated in the slots molded into the elastomeric rings 14 and 16 in the previous steps.

Figure 3:
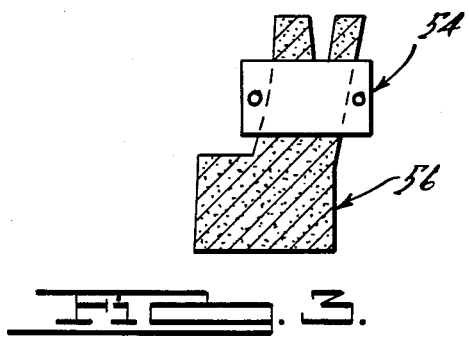
FIG. 3 is a sectional view of a vane core after removal from the mold of FIG. 2 and the elastomeric rings.

The cavity defined by the elastomeric rings 14 and 16 as shown in FIG. 2 is then filled with liquid plaster or resin coated sand and allowed to set up to form a core 56. Thereafter, the inner and outer retainer rings 36 and 38 are removed and core 56 having the elastomeric rings 14 and 16 thereabout are removed from the mold. The elastomeric rings 14 and 16 are then stripped from the blades 54 and core leaving the assembly seen in FIG. 3.

Figure 4:
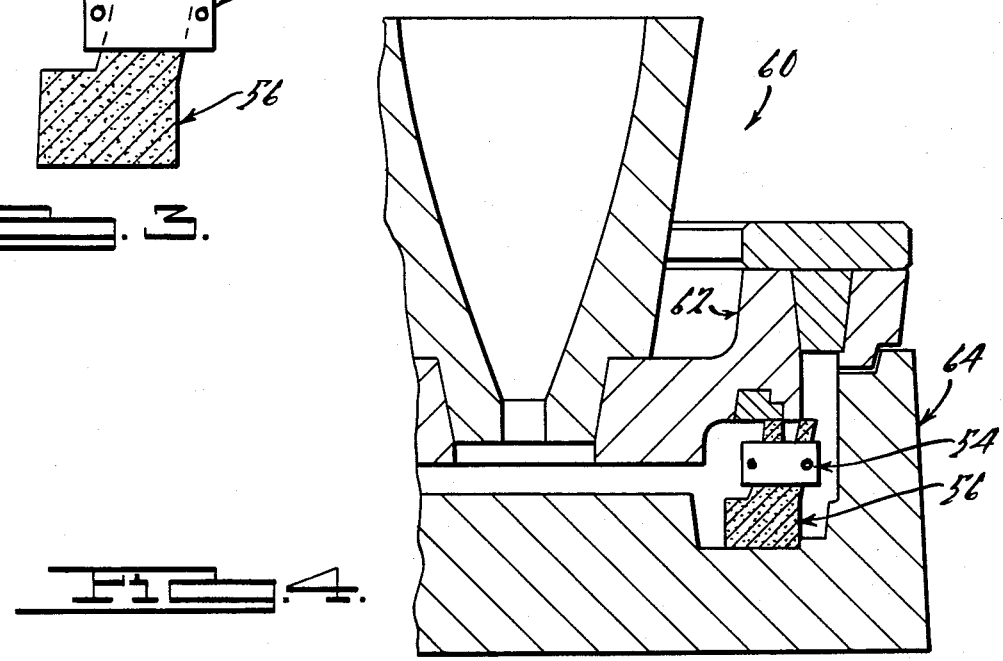
FIG. 4 is a sectional view of a core box with the vane core of FIG. 3 in casting position.

As seen in FIG. 4, the core ring 56 is assembled into a stator mold 60 comprising a resin sand or ceramic cope 62 and a resin sand or ceramic drag 64 to define a mold cavity in preparation for the bicasting process which will result in a cast stator, not shown, the ends of the blades 54 being cast firmly in place therein in a precise array.

While the preferred embodiment of the invention has been disclosed, it should be appreciated that the invention is susceptible of modification without departing from the scope of the following claims.

I claim:

1. A method of manufacturing a multibladed rotor or turbine stator or the like comprising the steps of:
   (a) mounting in a radial fashion a plurality of preformed circumferentially spaced dummy blades in a dummy blade ring,
   (b) filling the space around said ring and blade assembly with an elastomeric material to form a continuous annular elastomeric ring thereabout,
   (c) slitting said elastomeric ring longitudinally thereof,
   (d) stripping said elastomeric ring from said dummy blade ring and removing said dummy blades from said elastomeric ring,
   (e) assembling said elastomeric ring in a vane core mold box,
   (f) assembling in a radial fashion and in the position of the dummy blades a plurality of blades in said elastomeric ring,
   (g) filling the space between said elastomeric ring and between said blades with a frangible core material to form a blade core ring,
   (h) curing said core material,
   (i) removing said blade core ring, blades, and elastomeric ring from said vane core mold box,
   (j) stripping said elastomeric ring from said blade core ring,
   (k) placing said blade core ring and blade assembly in a cope and drag mold system, and
   (l) casting molten metal about said blade core ring and blades to form a turbine rotor or stator.

2. The method of claim 1 wherein a pair of elastomeric rings are cast in step (b) on opposite sides of said dummy blade ring so as to envelop opposite ends of said dummy blades, and are thereafter used in steps (c) through (j).

* * * * *